US012339446B2

(12) United States Patent
Abele

(10) Patent No.: US 12,339,446 B2
(45) Date of Patent: Jun. 24, 2025

(54) DISPLAY SYSTEM HAVING 1-DIMENSIONAL PIXEL ARRAY WITH SCANNING MIRROR

(71) Applicant: Magic Leap, Inc., Plantation, FL (US)

(72) Inventor: Nicolas Abele, Lausanne (CH)

(73) Assignee: Magic Leap, Inc., Plantation, FL (US)

( * ) Notice: Subject to any disclaimer, the term of this patent is extended or adjusted under 35 U.S.C. 154(b) by 930 days.

(21) Appl. No.: 17/427,601

(22) PCT Filed: Jan. 27, 2020

(86) PCT No.: PCT/US2020/015243
§ 371 (c)(1),
(2) Date: Jul. 30, 2021

(87) PCT Pub. No.: WO2020/159883
PCT Pub. Date: Aug. 6, 2020

(65) Prior Publication Data
US 2022/0121027 A1 Apr. 21, 2022

Related U.S. Application Data

(60) Provisional application No. 62/800,140, filed on Feb. 1, 2019.

(51) Int. Cl.
*G02B 27/01* (2006.01)
*G02B 26/10* (2006.01)

(52) U.S. Cl.
CPC ......... *G02B 27/0101* (2013.01); *G02B 26/10* (2013.01); *G02B 2027/0132* (2013.01)

(58) Field of Classification Search
CPC ... G02B 27/01–0189; G02B 2027/0105–0198; G02B 26/00–129;
(Continued)

(56) References Cited

U.S. PATENT DOCUMENTS 5,166,778 A  11/1992  Beamon, III
5,612,708 A   3/1997  Ansley et al.
(Continued)

FOREIGN PATENT DOCUMENTS

GB    2498179 A       7/2013
WO  WO 2020/159883    8/2020

OTHER PUBLICATIONS

International Search Report and Written Opinion for PCT Application No. PCT/US2020/015243, mailed Jun. 2, 2020.
(Continued)

*Primary Examiner* — Christopher A Lamb, II
(74) *Attorney, Agent, or Firm* — Seed IP Law Group LLP

(57) ABSTRACT

Display systems are described including augmented 1-dimensional pixel arrays and scanning mirrors. In one example, a pixel array includes first and second columns of pixels, relay optics configured to receive incident light and to output the incident light to a viewer, and a scanning mirror disposed to receive the light from the first and second columns of pixels and to reflect the received light toward the relay optics. The scanning mirror may move between a plurality of positions while the first and second columns emit light in temporally spaced pulses so as to form a perceived image at the relay optics having a higher resolution relative to the pixel pitch of the individual columns. Foveated rendering may provide for more efficient use of power and processing resources.

19 Claims, 18 Drawing Sheets

(58) Field of Classification Search
CPC ...... G02B 27/00–648; G03B 21/00–64; H04N 9/31–3197
See application file for complete search history.

(56) References Cited

U.S. PATENT DOCUMENTS

| | | | |
|---|---|---|---|
| 6,850,221 | B1 | 2/2005 | Tickle |
| 9,488,837 | B2 | 11/2016 | Nister et al. |
| 2001/0004251 | A1 | 6/2001 | Kurematsu et al. |
| 2006/0028436 | A1 | 2/2006 | Armstrong |
| 2007/0081123 | A1 | 4/2007 | Lewis |
| 2008/0001973 | A1* | 1/2008 | Willis .................. H04N 9/3114 345/108 |
| 2009/0195709 | A1 | 8/2009 | Kwon |
| 2010/0014054 | A1 | 1/2010 | Lapchuk et al. |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0299381 | A1 | 10/2016 | Lu et al. |
| 2016/0360191 | A1 | 12/2016 | Yang et al. |
| 2017/0235142 | A1* | 8/2017 | Wall ......................... G02B 5/26 359/633 |
| 2018/0052276 | A1 | 2/2018 | Klienman et al. |
| 2018/0120559 | A1 | 5/2018 | Yeoh et al. |
| 2019/0020858 | A1 | 1/2019 | Pappas et al. |
| 2019/0317329 | A1* | 10/2019 | Taylor .................... G02B 27/42 |
| 2020/0226977 | A1* | 7/2020 | Blank ..................... G06F 3/013 |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

DISPLAY SYSTEM HAVING 1-DIMENSIONAL PIXEL ARRAY WITH SCANNING MIRROR

PRIORITY CLAIM

This application claims priority from U.S. Provisional Application No. 62/800,140, filed Feb. 1, 2019 and titled "DISPLAY SYSTEM HAVING 1-DIMENSIONAL PIXEL ARRAY WITH SCANNING MIRROR," which is hereby incorporated by reference in its entirety.

BACKGROUND

Field

The present disclosure relates to display systems and, more particularly, to augmented and virtual reality display systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an AR scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

SUMMARY

In a first aspect, a display system is provided. The display system comprises a pixel array, relay optics, and a scanning mirror. The pixel comprises first and second columns of pixels. The relay optics is configured to receive incident light and to output the incident light to a viewer. The scanning mirror is disposed to receive the light from the first and second columns of pixels and to reflect the received light toward the relay optics. The scanning mirror is configured to move between a plurality of positions comprising a first position and a second position. The first position is oriented for the mirror to reflect the light from the first column of pixels onto the relay optics as a first one-dimensional array of pixels, and the second position is oriented for the mirror to reflect the received light from the second column of pixels onto the relay optics as a second one-dimensional array of pixels. Locations for the first and the second one-dimensional array of pixels define spatially overlapping lines on the relay optics.

In some embodiments, pixels of the first and second columns of pixels have a column pitch, wherein an effective pitch of a corresponding line of pixels on the relay optics is less than the column pitch. In some embodiments, the effective pitch is less than half the column pitch. In some embodiments, the pixel array is an emissive pixel array comprising an array of emissive pixels. In some embodiments, the emissive pixels comprise light emitting diodes (LEDs). In some embodiments, the emissive pixels have a pitch of 20 µm or less. In some embodiments, the first and second columns of pixels have parallel lengthwise dimensions, and pixels of the second column of pixels are offset along the lengthwise dimension relative to the pixels of the first column of pixels. In some embodiments, the pixels of the first column of pixels are configured to emit light while the scanning mirror moves from the first position to the second position, and the pixels of the second column of pixels are configured to emit light while the scanning mirror moves from the second position to the first position. In some embodiments, the pixel array further comprises at least a third column of pixels, the third column extending along the lengthwise dimension, wherein the third column is parallel to the first and second columns and the pixels of the third column are offset along the lengthwise dimension relative to the pixels of the first and second columns. In some embodiments, the first, second, and third columns are configured to emit light in temporally separated pulses during movement of the scanning mirror. In some embodiments, the pixel array is configured to provide image information corresponding to different total numbers of the pixels depending upon an orientation of the scanning mirror, such that effective pixel densities vary across the relay optics. In some embodiments, each of the first and second columns of pixels are doubled-up with a corresponding twin column having a same pixel pitch and same locations of pixels along a length of the column. In some embodiments, the relay optics comprises a waveguide comprising an in-coupling optical element configured to receive light reflected from the scanning mirror and to redirect the received light for propagation within the waveguide by total internal reflection, and an out-coupling optical element configured to out-couple light propagating within the waveguide by total intern reflection. In some embodiments, the relay optics comprises stack of waveguides, each waveguide comprising an in-coupling optical element and an out-coupling optical element. In some embodiments, the pixel array is a transmissive pixel array.

In a second aspect, an optical apparatus is provided. The optical apparatus includes a pixel array comprising a first column of pixels having a first pixel pitch along a lengthwise dimension of the first column, and a second column of pixels having the first pixel pitch along a lengthwise dimension of the second column. The lengthwise dimension of the first column extends along the lengthwise dimension of the second column, and the pixels of the second column are offset along the lengthwise dimension relative to the pixels of the first column.

In some embodiments, the optical apparatus further comprises a scanning mirror disposed to receive the light from the first and second columns of pixels and to reflect the received light toward relay optics configured to direct received light to a viewer. In some embodiments, the optical apparatus is configured to modify effective pixel densities by providing unique image information from less than all of the pixels of the first and second columns. In some embodiments, each of the first and second columns of pixels are doubled-up with a corresponding column twin having a same pixel pitch and same locations of pixels along a length of the column. In some embodiments, the pixels of the first and second columns have a same size and shape.

DETAILED DESCRIPTION

Figure 1:
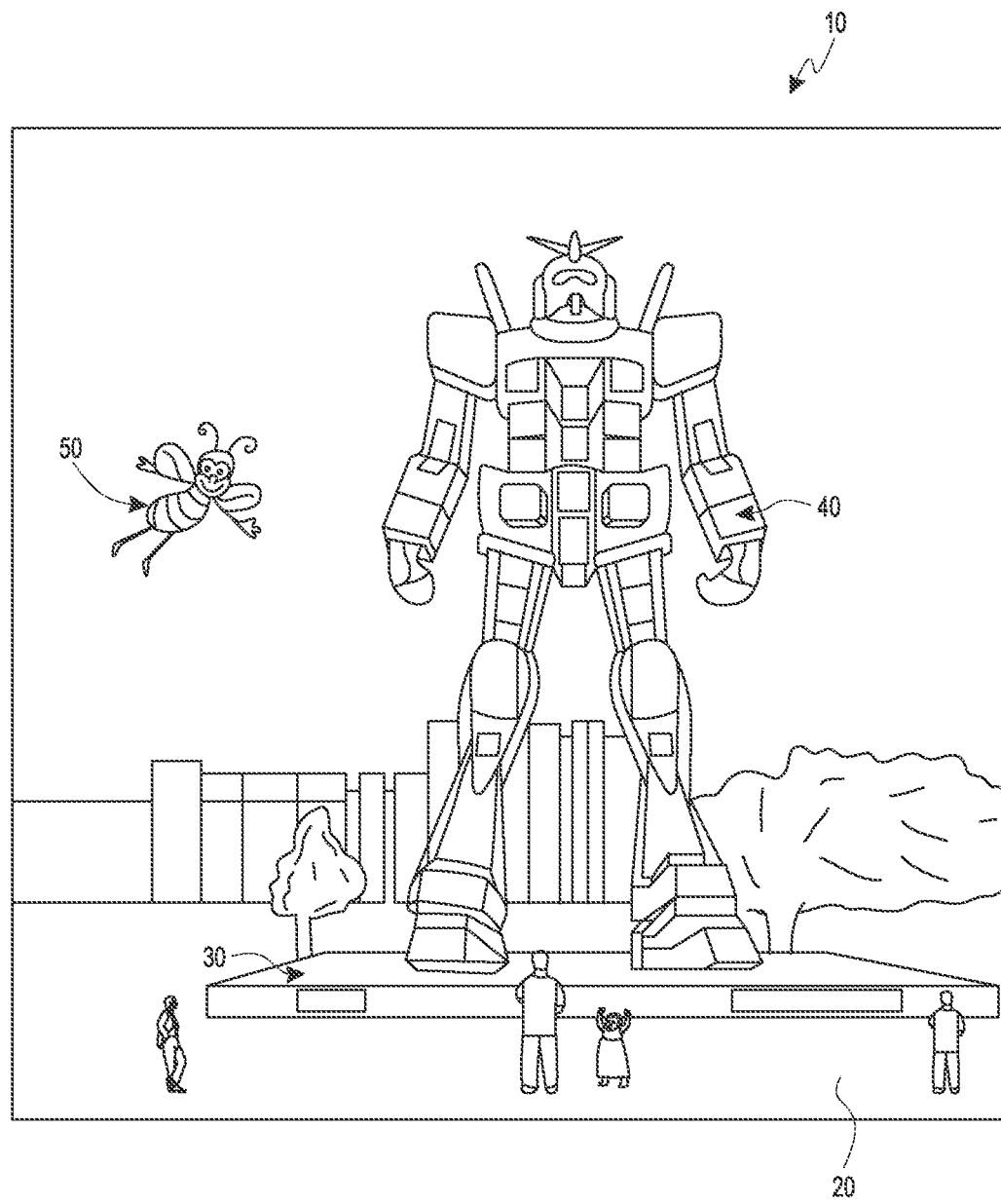
FIG. 1 illustrates a user's view of augmented reality (AR) through an AR device.

Augmented reality (AR) or virtual reality (VR) systems may display virtual content to a user, or viewer. This content may be displayed on a head-mounted display, for example, as part of eyewear, that projects image information to the user's eyes. In addition, where the system is an AR system, the display may also transmit light from the surrounding environment to the user's eyes, to allow a view of the surrounding environment. As used herein, it will be appreciated that a "head-mounted" or "head mountable" display is a display that may be mounted on the head of the user or viewer.

In some display systems, light encoded with image information (also referred to as image light) may be provided from one or more spatial light modulators, which may direct the image light into relay optics that relay the image light to the eye of the user. In some embodiments, the relay optics may include one or more waveguides, such as a stack of waveguides, and may be configured to form virtual images at a plurality of virtual depth planes (also referred to simply a "depth planes" herein) perceived to be at different distances away from the user. In some embodiments, different waveguides of the stack of waveguides may have optical structures providing different optical powers and may simulate the wavefront divergence of light propagating from objects at different distances from the user's eye. In some embodiments, as an alternative to, or in addition to waveguide optical structures for providing optical power, the display systems may include one or more lenses (e.g., a pair lenses sandwiching a waveguide) that provide or additionally provide optical powers. Light from a spatial light modulator may be directed toward the waveguides, and may be in-coupled into an individual waveguide by an in-coupling optical element of each waveguide. The in-coupling optical element may be a diffractive optical element, such as a grating. As used herein, it will be appreciated a spatial light modulator provides light output with spatially varying qualities (e.g., differences in light intensity and/or wavelength); thus, the light output may be understood to be modulated spatially, e.g., by altering the transmission of light through the spatial light modulator or by modulating the emission of light generated by the spatial light modulator.

Preferably, the spatial light modulators providing light to the relay optics are small, to facilitate desirable form factors for head-mounted display systems. However, the miniaturization of spatial light modulators may constrain the available resolution of the spatial light modulators and, thus, of the display system. For example, reducing the size of a spatial light modulator may reduce the area available to accommodate pixels. However, reductions in the spacing between individual pixels may be hindered by, e.g., manufacturing limitations. As a result, the resolution of the display system may be limited by the physical size of the spatial light modulator and the physical density of pixels of the spatial light modulator.

Advantageously, according to some embodiments, a higher perceived pixel density and resolution may be achieved using pixel arrays with relatively low pixel density or resolution. In some embodiments, a display system includes pixel arrays configured to project light to relay optics using a movable or scanning reflective element, such as a MEMS scanning mirror, which moves repeatedly between a plurality of positions (e.g., by oscillating). The pixel array comprises at least two columns of pixels, which together may be used to form at least part of one line of resolution of images shown by the display system. The pixels of a first column are offset or staggered relative to the pixels of a second column, such that when the first column is overlaid by the second column, the pixels of the second column occupy the spaces between the pixels of the first column. The output of image information by each column of pixels is synchronized with the position, or orientation, of the scanning reflective element. For example, the first column of pixels direct light to the reflective element when the reflective element is at a first position that causes the light to be directed to a particular location on the relay optics. The second column of pixels subsequently direct light to the reflective element when the reflective element is at a second position that causes the light to be directed to the same particular location on the relay optics. As result, the second column of pixels effectively overlays the first column of pixels, except that the staggering of the pixels of each column causes the pixels of the second column to occupy the spaces between the pixels of the first column when projected onto the relay optics. Thus, the effective or perceived resolution at the relay optics may advantageously be double the physical density of pixels of the first or second column; both the first and second columns provide pixels for a single line of resolution as the scanning reflective element scans to provide all lines of resolution across the relay optics.

In some other embodiments, the number of columns may be increased. For example, additional offset columns may be provided, with each of the additional offset columns providing pixels that, when projected onto the relay optics, occupy spaces in a line between pixels projected from other columns. Thus, the number of pixels along a line of resolution may be further increased using these additional columns; each column may provide individual pixels to individual lines of resolution.

In addition, it will be appreciated that the spacing between lines of resolution may be selected based upon the synchronization of light from the columns and the position of the scanning reflective element. For example, pulsing light from the columns of pixels more quickly would provide more closely spaced lines of resolution than pulsing light more slowly, since the placement of these lines of resolution depends upon the position of the scanning reflective element; allowing the scanning reflective element to move longer results in a larger change in position, which results in a greater separation between lines of image light reflected from the reflective element to the relay optics. Thus, advantageously, the number of pixels within each line of resolution may be selected based upon the number of pixel columns in the pixel array, and the perceived separation between lines of resolution may be selected based upon the rate at which the columns of pixels are pulsed on and off to provide image information. It will be appreciated that pulsing the pixels on causes them to output image light while pulsing the pixels off causes the pixels to not output image light.

In some embodiments, the display system may be configured for foveated image projection, in which different parts of an image, corresponding to different parts of a user's field of view, have different resolutions. The different resolutions may be achieved by outputting image information from less than all of the pixels in the various columns, or by outputting the same image information from more than one pixel, depending upon where the pixels are projected.

In some embodiments, individual columns may be doubled-up, tripled-up, etc. with another similar, non-offset column such that more than one column provides the same image information. For example, two or more columns may provide directly overlapping projected pixels on the relay optics. Using multiple pixel columns to provide the same image information can advantageously increase the perceived luminance of pixels of the pixel array, since the light from pixels of multiple columns may be perceived as coming from a single pixel.

Preferably, the columns of pixels are configured to pulse light to the scanning reflective element at a sufficiently high rate that all desired lines of resolution are projected to the relay optics within a sufficiently short duration such that the human visual system does not perceive the lines of resolution as being presented at different times. Without being limited by theory, the visual system may perceive pixels or lines of resolution directed to the retina within a flicker fusion threshold as being present simultaneously. As an example, the flicker fusion threshold may be about 1/60 of a second. Preferably, all lines of resolution for an image are presented within the flicker fusion threshold. In some embodiments, the pixel array may be an emissive pixel array, such as a micro-LED, which advantageously comprises pixels that may be turned on and off at a sufficiently high rate to provide all lines of resolution for forming an image within the flicker fusion threshold.

Advantageously, display systems according to some embodiments can provide various advantages. For example, as discussed above, the display systems can output images with high-resolution while using relatively low resolution pixel arrays, which may be readily available and relatively inexpensive. In addition, the use of pixel arrays, such as micro-LEDs, with high refresh rates may provide the desired high resolution without the user perceiving pulsing of the pixel arrays or scanning lines of resolution. The use of columns of pixels, rather than a full panel corresponding to the entire resolution of the display system, provides a highly compact pixel array and associated projection system for outputting images, which facilitates head-mounted displays with desirable form factors. Moreover, because only one column of pixels is active at a time, relatively low power or low speed electronics may be used to drive the pixel array, which may have advantages for decreasing energy consumption and increasing battery life.

Reference will now be made to the drawings, in which like reference numerals refer to like parts throughout. Unless indicated otherwise, the drawings are schematic and not necessarily drawn to scale.

Figure 2:
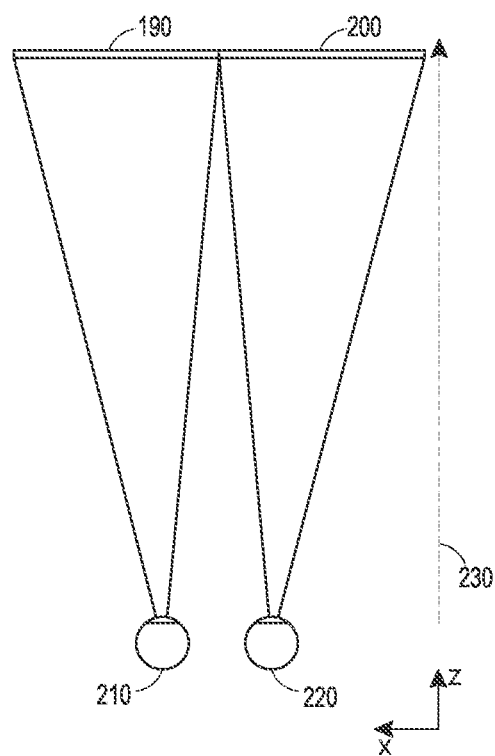
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
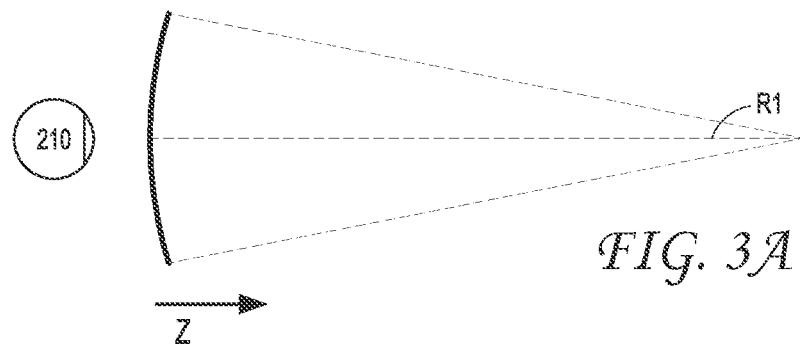
FIGS. 3A-3C illustrate relationships between radius of curvature and focal radius.
Figure 3B:
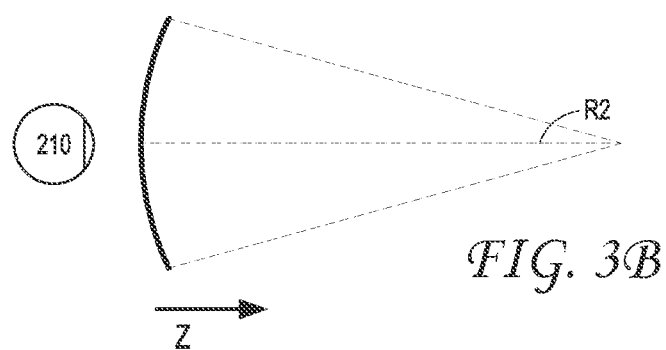
Figure 3C:
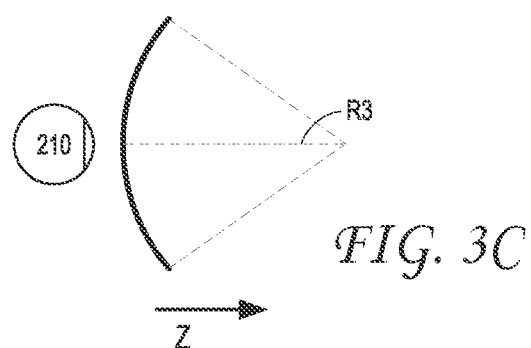

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
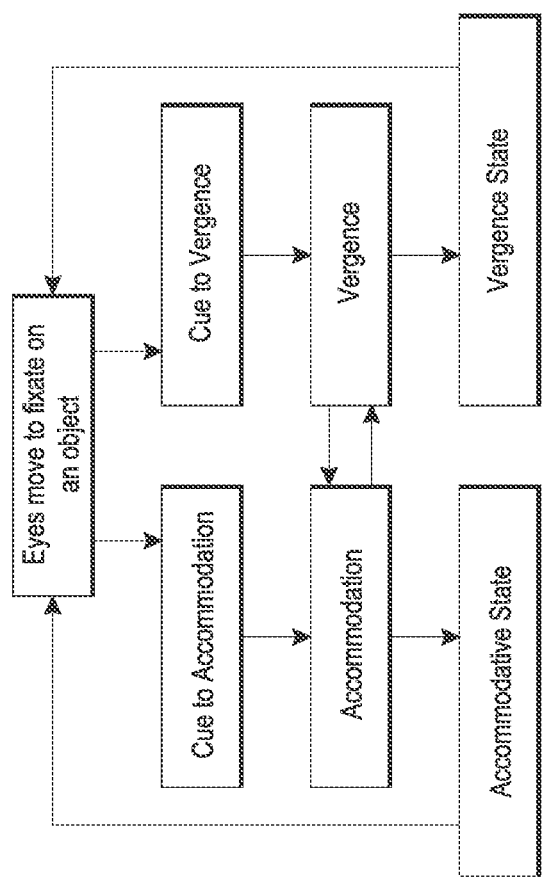
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
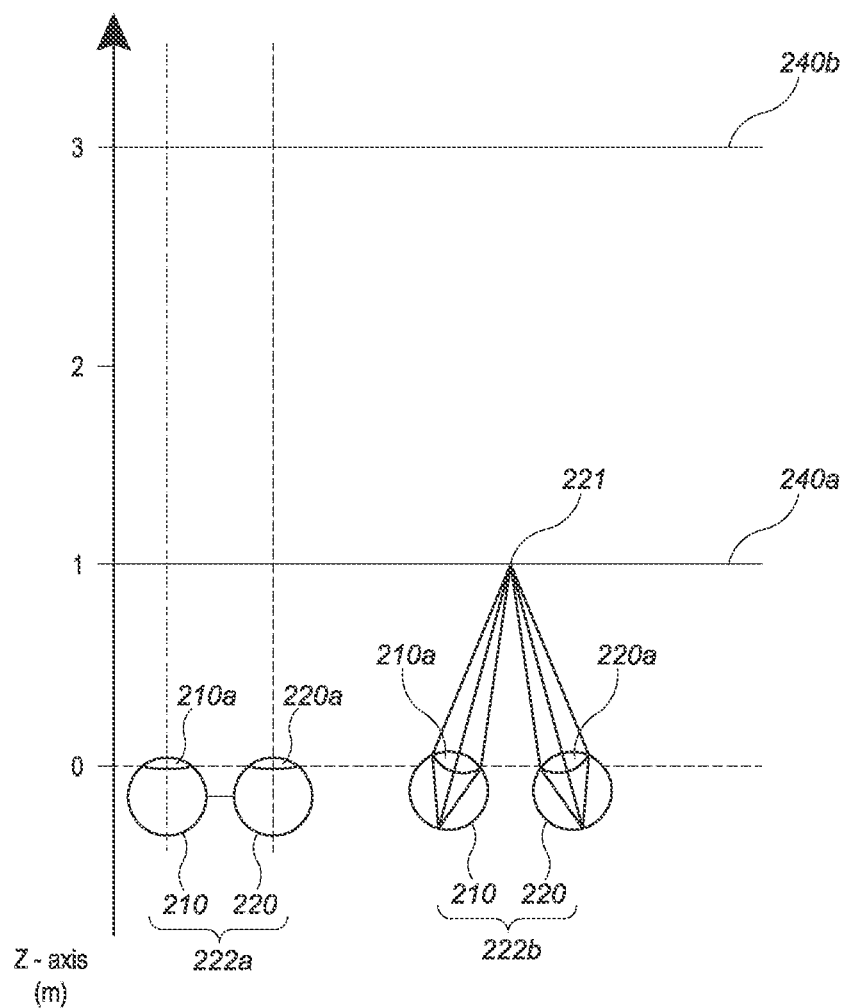
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
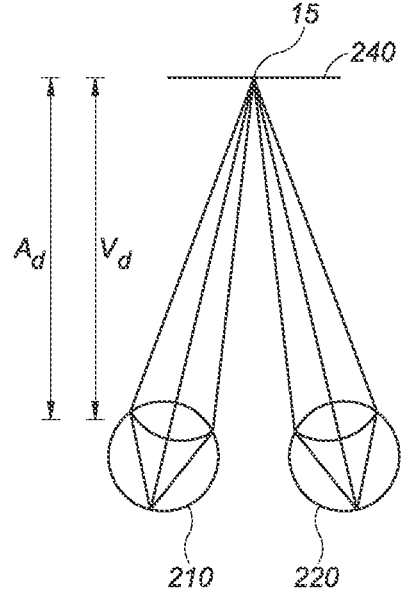
FIG. 4C illustrates an example of a representation of a top-down view of a user viewing content via a display system.
Figure 4D:
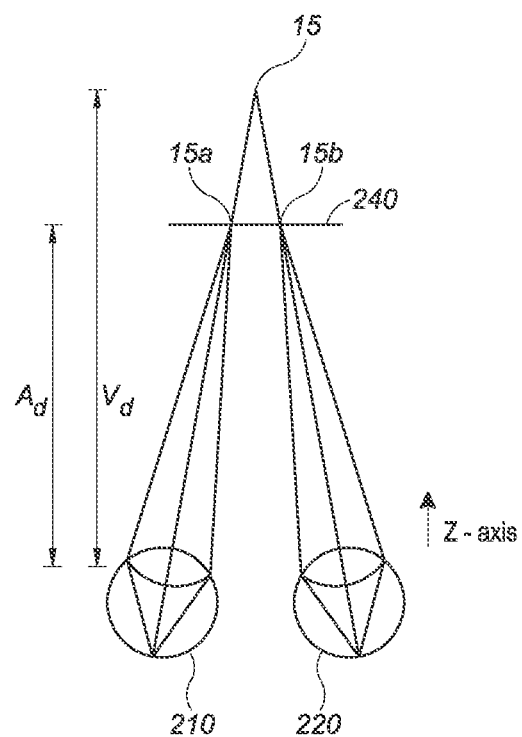
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
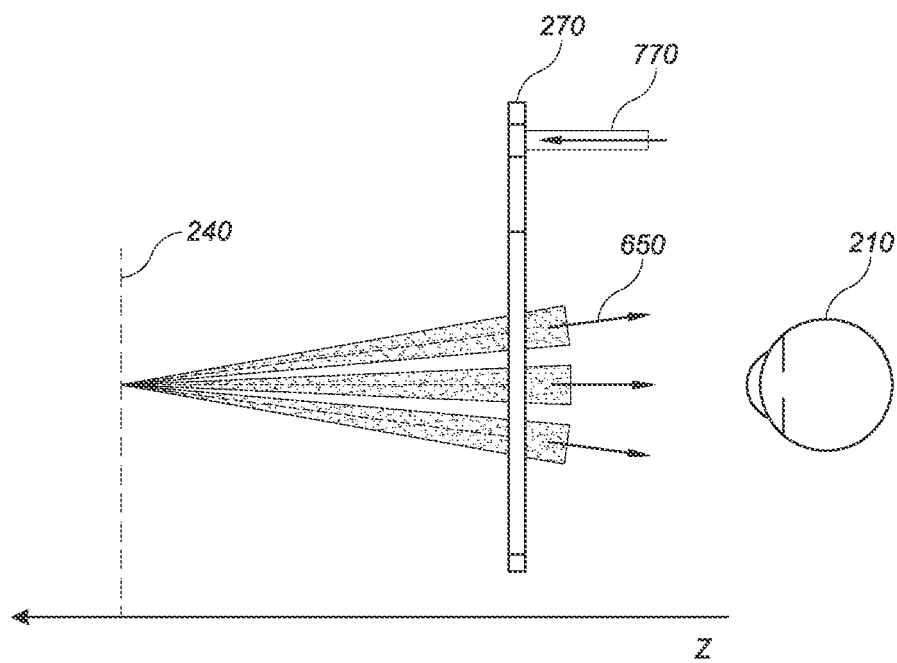
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
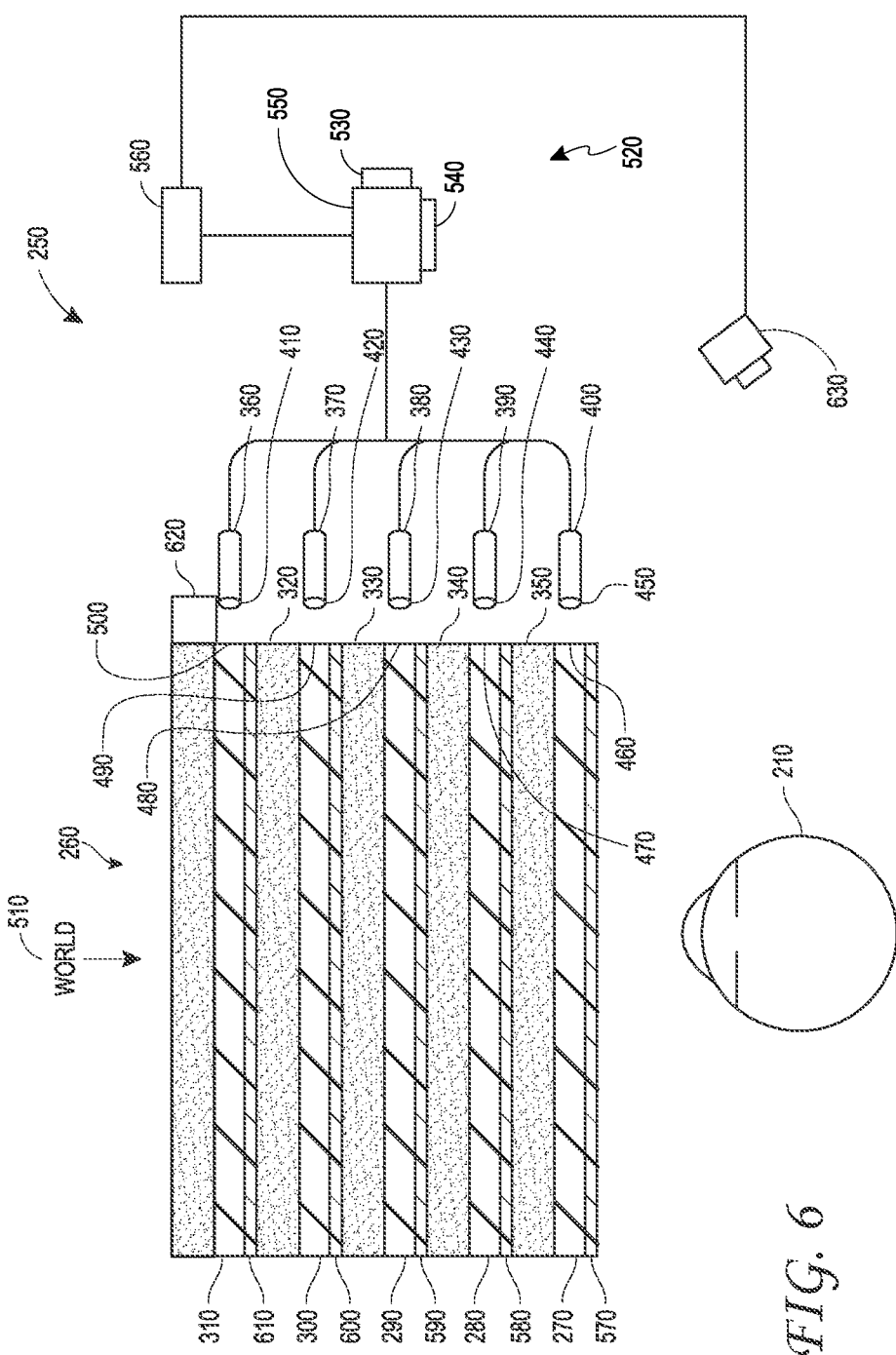
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projection system 520, comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) display. In some other embodiments, the spatial light modulator may be a MEMS device, such as a digital light processing (DLP) device. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments. In some embodiments, the controller controls and synchronizes the operation of the light projection system 520 and the scanning reflective element 1030 (FIG. 10).

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

The camera assembly 630 may, in some embodiments, observe movements of the user, such as the user's eye movements. As an example, the camera assembly 630 may capture images of the eye 210 to determine the size, position, and/or orientation of the pupil of the eye 210 (or some other structure of the eye 210). The camera assembly 630 may, if desired, obtain images (processed by processing circuitry of the type described herein) used to determine the direction the user is looking (e.g., eye pose or gaze direction). In some embodiments, camera assembly 630 may include multiple cameras, at least one of which may be utilized for each eye, to separately determine the eye pose or gaze direction of each eye independently. The camera assembly 630 may, in some embodiments and in combination with processing circuitry such as the controller 560 or the local data processing module 140, determine eye pose or gaze direction based on glints (e.g., reflections) of reflected light (e.g., infrared light) from a light source included in camera assembly 630.

Figure 7:
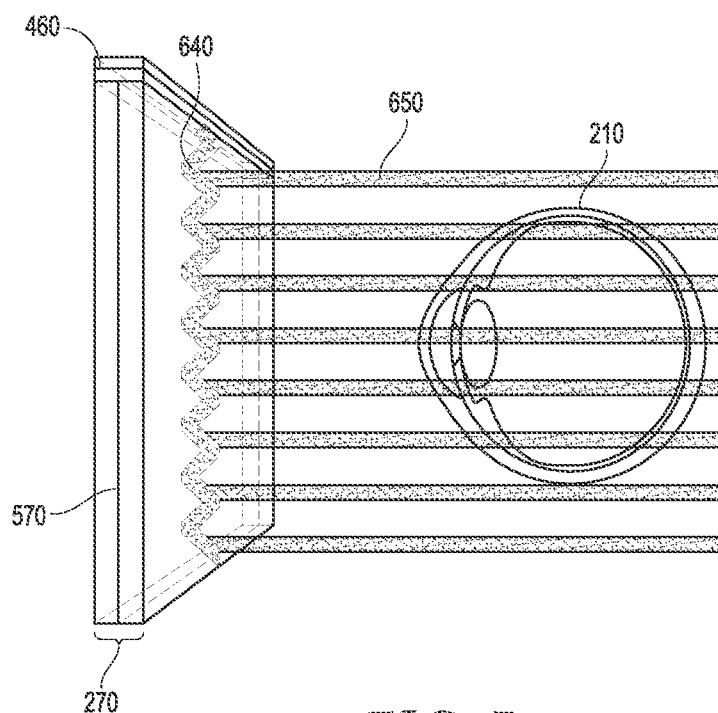
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
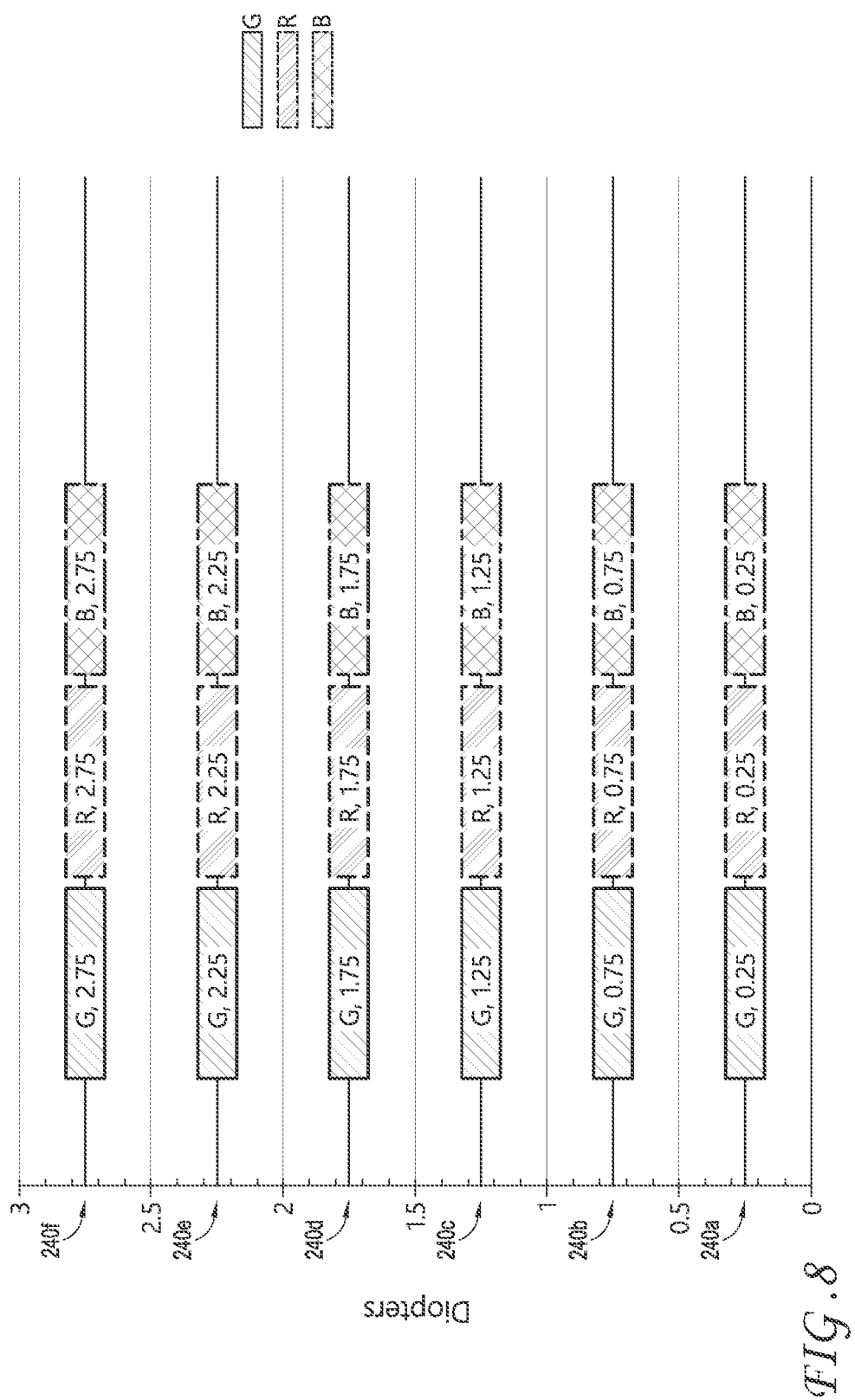
FIG. 8 illustrates an example of a stacked eyepiece in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
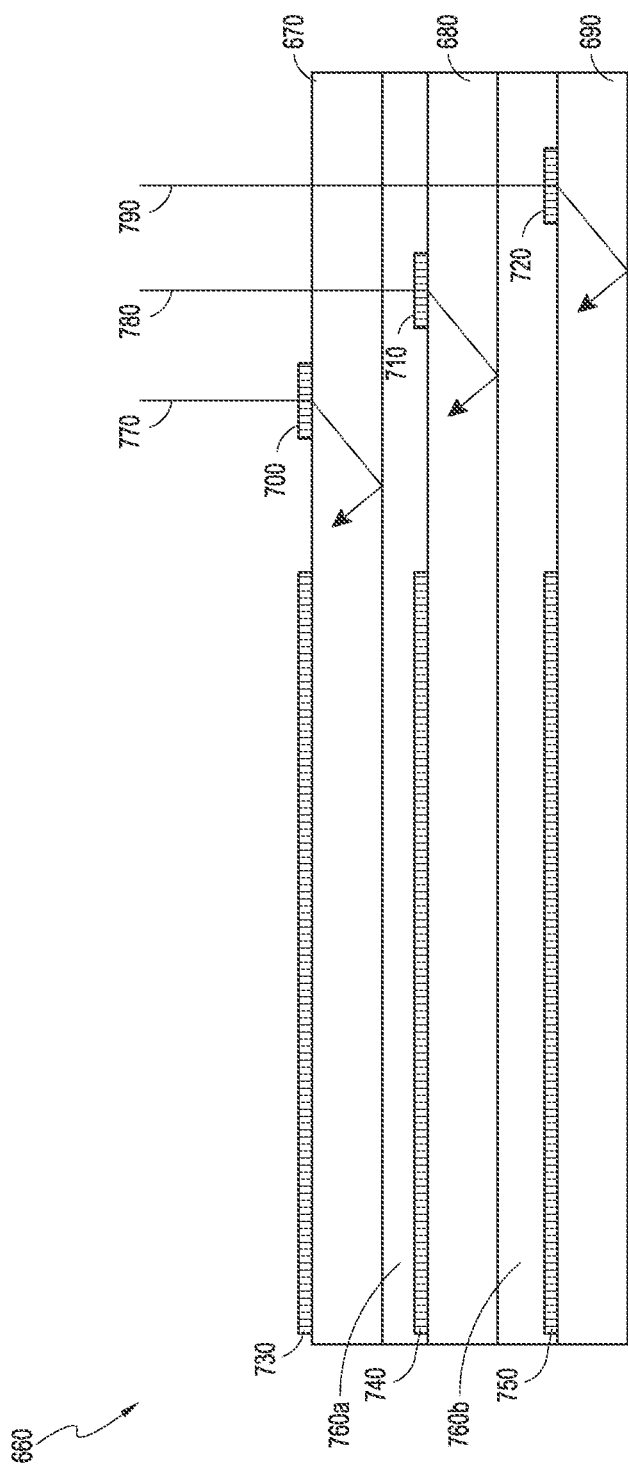
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another, as seen in the illustrated head-on view in a direction of light propagating to these in-coupling optical elements. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
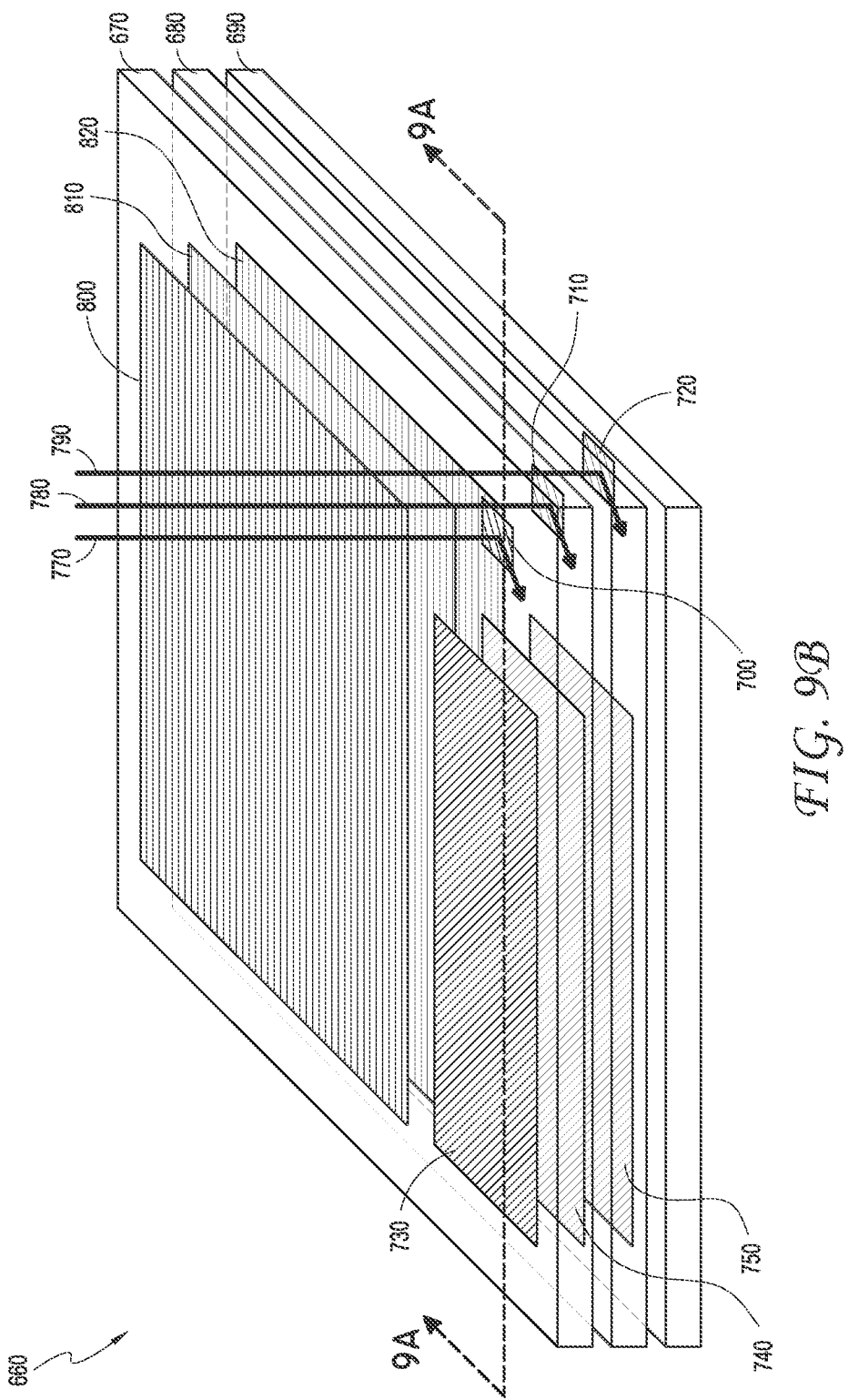
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
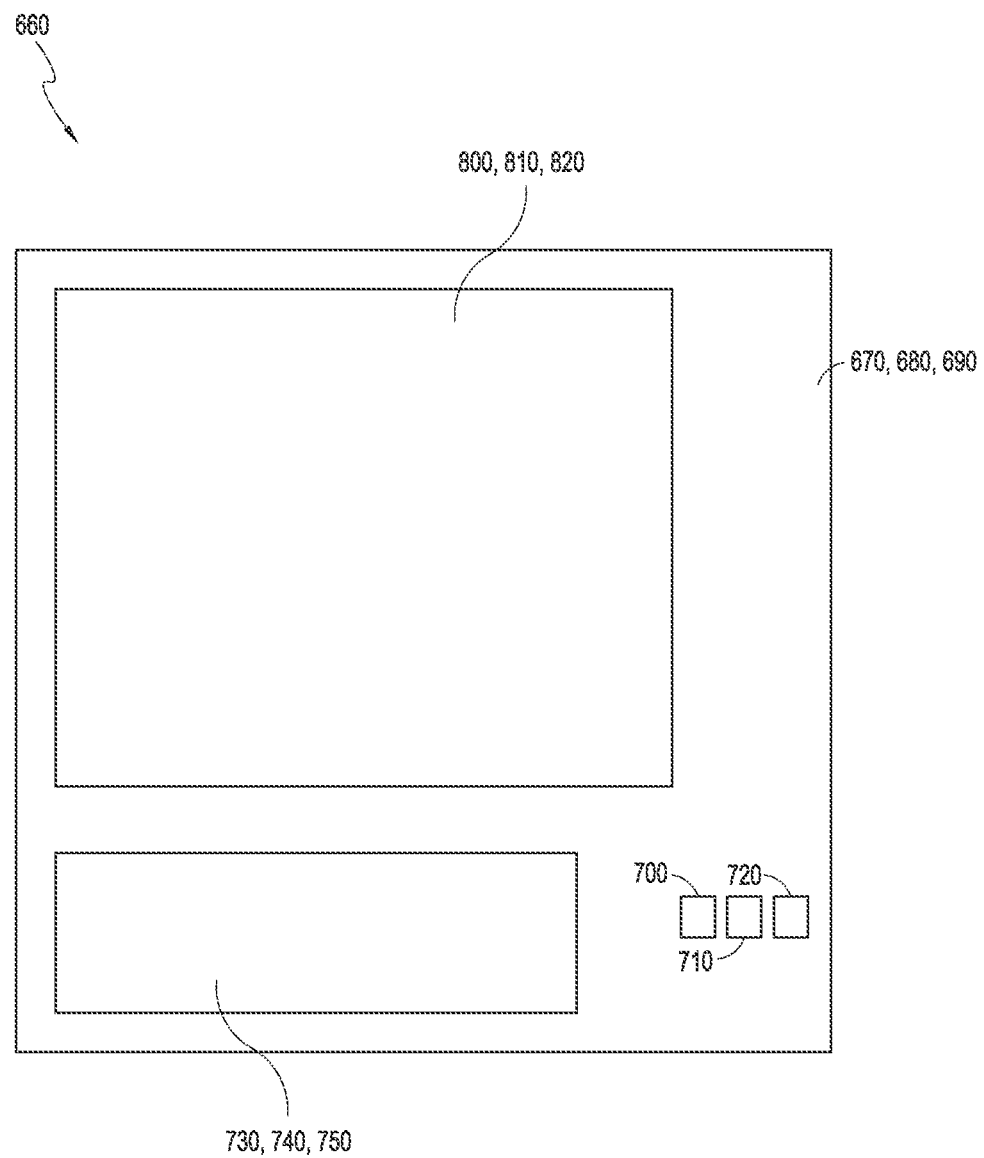
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. It will be appreciated that this top-down view may also be referred to as a head-on view, as seen in the direction of propagation of light towards the in-coupling optical elements 800, 810, 820; that is, the top-down view is a view of the waveguides with image light incident normal to the page. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

It will be appreciated that the spatially overlapping areas may have lateral overlap of 70% or more, 80% or more, or 90% or more of their areas, as seen in the top-down view. On the other hand, the laterally shifted areas may have lateral overlap of less than 30% overlap, less than 20% overlap, or less than 10% overlap of their areas, as seen in the top-down view. In some embodiments, laterally shifted areas have no overlap.

Figure 9D:
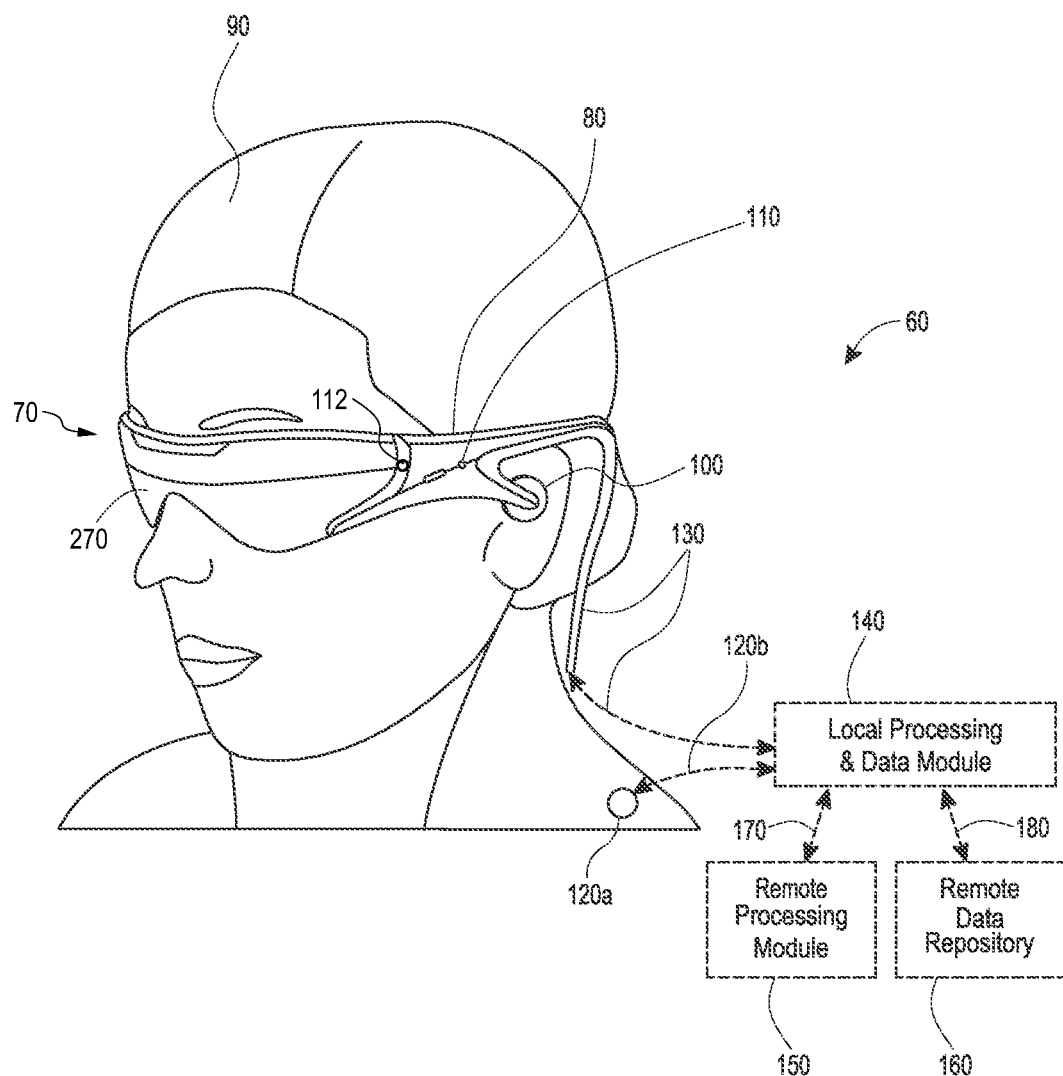
FIG. 9D illustrates an example of wearable display system.
Figure 10:
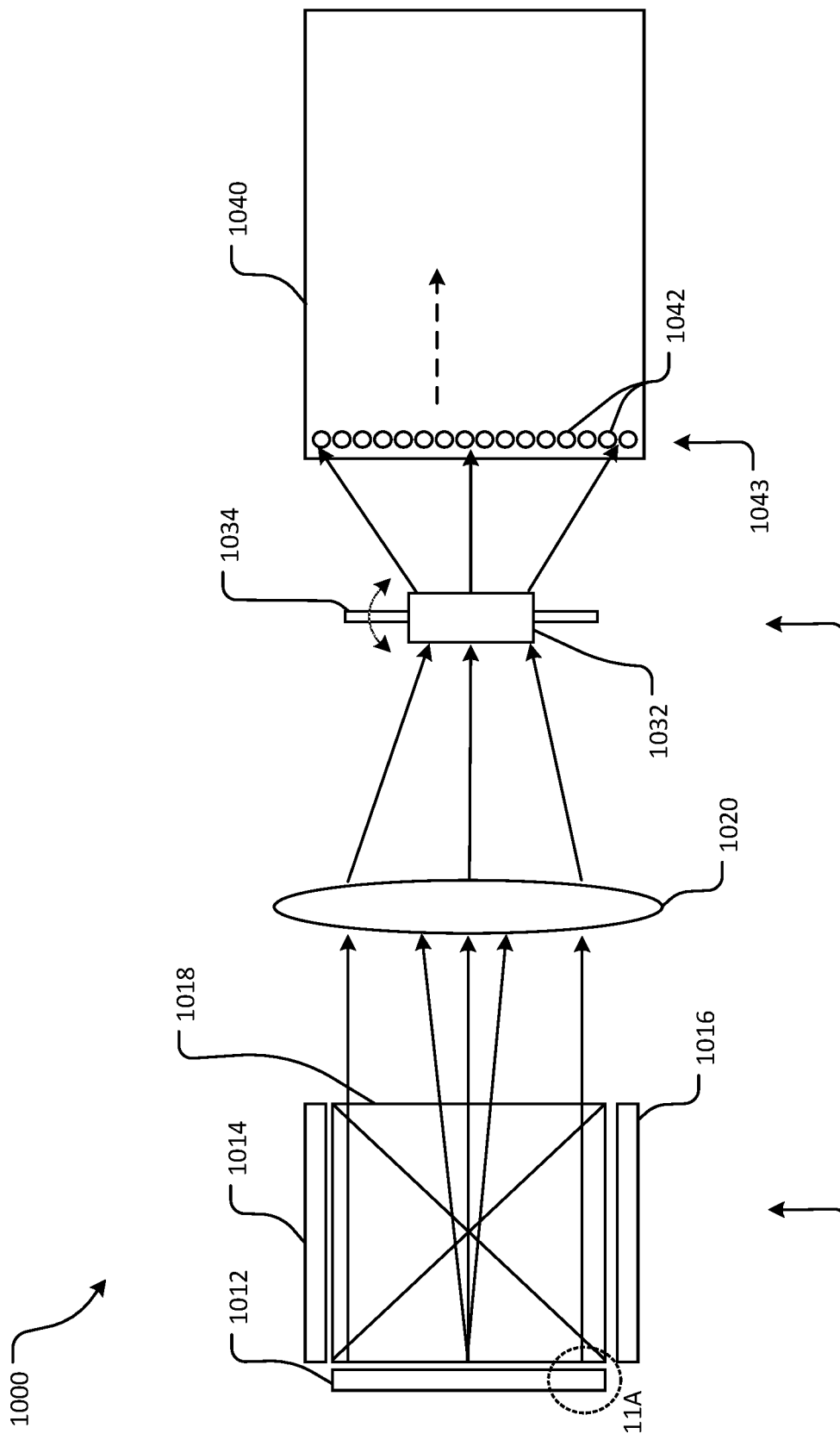
FIG. 10 illustrates an example of a display system including augmented 1-dimensional pixel arrays and a scanning mirror.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. The display 70 may include one or more waveguides, such as the waveguide 270, configured to relay in-coupled image light and to output that image light to an eye of the user 90. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Example Displays Including Augmented 1-Dimensional Pixel Arrays

FIG. 10 illustrates an example of a display system that includes an augmented 1-dimensional (1D) pixel array and a scanning reflective element, e.g., a scanning mirror. As described herein, image light from the pixel array may be projected, via the scanning reflective element, onto relay optics such as one or more waveguides to form 2-dimensional (2D) images visible by a user. In some embodiments, the image light is projected onto in-coupling optical elements (e.g., in-coupling optical elements 700, 710, 720 of FIGS. 9A-9C). It will be understood that the pixel array may include transmissive and/or emissive pixel elements. In some embodiments, the pixel array is an emissive pixel array comprising light-emitting pixels. Some embodiments of emissive pixel arrays include LED and OLED arrays, including micro-LED arrays.

Preferably, 2D images are provided by an augmented 1-dimensional (1D) pixel array in combination with a scanning reflective element such as a micro-electro-mechanical system (MEMS) scanning mirror. As discussed herein, the projection of images using an augmented 1D pixel array in combination with a scanning reflective element may provide a number of advantages, including reducing the size and number of pixels of each pixel array, reducing power consumption by the display, increasing resolution and/or field of view, and others. It will be appreciated that the pixel array may be referred to as a 1D array since, at any given moment, only one columns of pixel output image information (modulated light) to provide one line of resolution at a given time. The 1D array is augmented in the sense that more than one column of pixels is physically present, and different pixel columns of the 1D array may output light at different times.

With continued reference to FIG. 10, a display system 1000 includes a light projection system 1010 which includes pixel arrays 1012, 1014, 1016, and an optical lens structure 1020. The optical lens structure 1020 outputs light to a scanning reflective element 1030 which directs image light from the pixel arrays 1012, 1014, 1016 onto a light-receiving area 1040 of relay optics. In some embodiments, the display system 1000 may correspond to the display system 250 (FIG. 6), and the light projection system 1010 may correspond to the light projection system 520 (FIG. 6). In some embodiments, the relay optics may comprise one or more waveguides 670, 680, 690 (FIGS. 9A-9C), and the illustrated light-receiving area 1040 may be part of the in-coupling optical element of a waveguide, such as the in-coupling optical elements 700, 710, 720 (FIGS. 9A-9C). It will be appreciated that the relay optics may take the form of various other optical structures for directing image light from the projection system 1010 to the eyes of a viewer. For example, in some embodiments, the relay optics may include a birdbath combiner comprising a semitransparent mirror that both directs image light to a viewer and allows a view of the ambient environment.

With continued reference to FIG. 10, the pixel arrays 1012, 1014, 1016 are preferably emissive pixel arrays, which provide advantages for rapidly cycling pixels on and off. In one example, pixel arrays 1012, 1014, and 1016 may each be monochrome pixel arrays, each of which comprises an array of monochromatic pixels of a single color (e.g., red, green, and blue-light emitting pixels). An optical combiner 1018, such as a dichroic x-cube, may combine the light emitted from the pixel arrays 1012, 1014, 1016 and direct the emitted light to the optical lens structure 1020. Preferably, after being combined by the optical combiner 1018, corresponding pixels from the pixel arrays 1012, 1014, 1016 directly overlap when outputted from the optical lens structure 1020 such that the pixels are perceived as full color pixels.

In some embodiments, monochromatic pixel arrays 1014, 1012, and 1016 may be located adjacent to each other, for example, in the location of spatial light modulator 1012 in FIG. 10. In such embodiments, the optical combiner 1018 may be omitted. Any lateral offset between the adjacent spatial light modulators 1014, 1012, and 1016 may result in a spatial offset between the corresponding pixels of each pixel array 1014, 1012, 1016. Time-modulation of the outputs of the adjacent pixel arrays 1014, 1012, and 1016 may be implemented to compensate for such spatial offset; for example, the emission of light by each pixel array 1014, 1012, and 1016 may be timed with the orientation of scanning reflective element 1030 such that corresponding pixels of each of the pixel arrays are reflected such that they spatially overlap in the light-receiving area 1040.

In some embodiments, the light projection system 1010 may include one or more full color pixel arrays. Each full color array may include pixels that comprise a group of subpixels, with each group having at least one subpixel of each component color. In some embodiments, the pixel array 1012 may be a full color pixel array and the pixel arrays 1014, 1016 and the combiner 1018 may be omitted. In some other embodiments, the light projection system 1010 may include two or move pixel arrays 1014, 1012, 1016 that are full color and the optical combiner 1018 may be retained. It will be appreciated that the use of multiple full color pixel arrays may advantageously increase the perceived brightness of images formed using the arrays. In some embodiments, the pixel arrays 1012, 1014, and 1016 may each be full color pixel arrays. In some embodiments, each pixel array may be independently operable to provide greater latitude in adjusting the brightness of the aggregate pixels perceived by a viewer. Alternatively, the display system 1000 may include two pixel arrays (e.g., 1012, and 1014), and the optical combiner 1018 may be a dichroic mirror or the like for combining light from two light sources. In these examples, the brightness of the displayed image may be adjusted by simultaneously projecting the same image content from one, two, or all of the pixel arrays 1012, 1014, 1016, where projecting light from only one pixel array 1012, 1014, 1016 produces a relatively low-brightness image and projecting light from all of the pixel arrays 1012, 1014, 106 produces the brightest possible image for the display system 1000.

It will be appreciated that full color pixel arrays may have a spatial offset between the component color pixels corresponding to a single display pixel. For example, for RGB arrays, monochrome pixels of the colors red, green, and blue may be arrays in vertical columns; that is, one column may have red pixels, a second column may have green pixels, and a third column may have blue pixels. Accordingly, similar to embodiments in which a plurality of single-color pixel arrays are located adjacent to each other, time modulation may be used to compensate for the spatial offset between different corresponding component color pixels. For example, the emission of light pixels of different component colors may be timed with the orientation of scanning reflective element 1030 such that corresponding pixels of each color are reflected such that they spatially overlap in the light-receiving area 1040, thereby allowing three component color pixels to form a single full-color displayed pixel.

With continued reference to FIG. 10, the optical lens structure 1020 is configured to receive light from the pixel arrays 1012, 1014, and/or 1016 and to appropriately focus this light to ultimately provide a focused image in the eye of a viewer. It will be appreciated that the optical lens structure 1020 may include one or more optical structures or lenses to achieve the desired light focusing.

Light outputted by the optical lens structure 1020 is routed to the light-receiving area 1040 using the scanning reflective element 1030. In some embodiments, the scanning reflective element 1030 includes a mirror 1032 or other reflective surface fixed to an actuator 1034. As examples, the actuator 1034 may be a MEMS device, a piezoelectric oscillator, a MEMS-based piezoelectric oscillator, etc. The actuator 1034 is preferably configured to move the mirror 1032 in a periodic motion about an axis parallel to the plane of the mirror 1032, such that the mirror assumes particular positions or orientations at regular intervals. For example, the actuator 1034 may rotate or swivel the mirror 1032. The scanning reflective element 1030 is located such that light from the light projection system 1010 propagates from the optical lens structure 1020 and is incident on the mirror 1032.

In some embodiments, the optical lens structure 1020 converges light onto the mirror 1032, which may be spaced from the optical lens structure 1020 at approximately the focal length of the converging optical lens structure 1020 such that a relatively small mirror 1032 can be used to reflect the entire image projected by the light projection system 1010. In some embodiments, light is specularly reflected from the mirror 1032 and diverges until incident on the light-receiving area 1040. In some embodiments, the mirror 1032 may be located at a distance other than the focal length of the converging optical lens structure 1020. Although placement of the mirror 1032 at approximately the focal length may result in an advantageously small mirror 1032, usefully small mirror sizes may still be achieved at other locations between the converging optical lens structure 1020 and the light-receiving area 1040.

The light projected onto the relay optics light-receiving area 1040 includes a column or line 1043 of pixels 1042. The pixels 1042 correspond to a column of pixels of each pixel array 1012, 1014, 1016. Scanning of the mirror 1032 by the MEMS device 1034 causes the location of the projected column of pixels 1042 to move laterally across the light-receiving area 1040. The range of motion of the MEMS device 1034 may be selected such that a first position of the MEMS device 1034 causes the mirror 1032 to reflect the column of pixels 1042 at a first end of the light-receiving area 1040 and a second position of the MEMS device 1034 causes the mirror 1032 to reflect another column of pixels (not shown) at the opposite end of the light-receiving area 1040. It will be appreciated that the light-receiving area 1040 is sized to encompass the desired field of view of the display system 1000. In some embodiments, the mirror 1032 may modify the available field of view by appropriately constraining or expanding its range of motion and/or the pixel arrays 1012, 1014, 1016 may be synchronized with the motion of the mirror 1032 such that projected light extends over a greater or a lesser total area of the light-receiving area 1040.

The light emitted by each pixel of the pixel arrays 1012, 1014, 1016 may be controlled to rapidly pulse on and off and to refresh based on the instantaneous position of the mirror 1032. In some embodiments, a single sweep of the scanning reflective element 1030 may allow a full image to be projected across substantially all of the light-receiving area 1040. However, a single sweep would populate light-receiving area 1040 with only pixels from a single column of pixels of a pixel array. As discussed further herein, the pixel array preferably includes at least one additional off-set column of pixels, which may be utilized to provide an increased effective pixel resolution. Thus, preferably, at least a second sweep of the scanning reflective element 1030 across the light-receiving area 1040 is used to further populate the light-receiving area with additional pixels from the offset column of pixels. Thus, one sweep the scanning reflective element 1030 presents pixels from one column of the pixel array, and an additional sweep of the scanning reflective element 1030 presents pixels from another offset column of pixels of the pixel array. Preferably, the scanning reflective element 1030 sweeps across the light-receiving area 1040 and presents pixels from all columns of pixels at a rate that is greater than the flicker fusion threshold, such that a viewer perceives all of the presented pixels as being simultaneously present. In various embodiments, the scan frequency (e.g., refresh rate or frequency) of the scanning reflective element 1030 may be relatively fast, for example, in the range of 100 Hz to 1 kHz, 200 Hz to 800 Hz, etc. In one example, the scan frequency may be approximately 450 Hz.

Figure 11A:
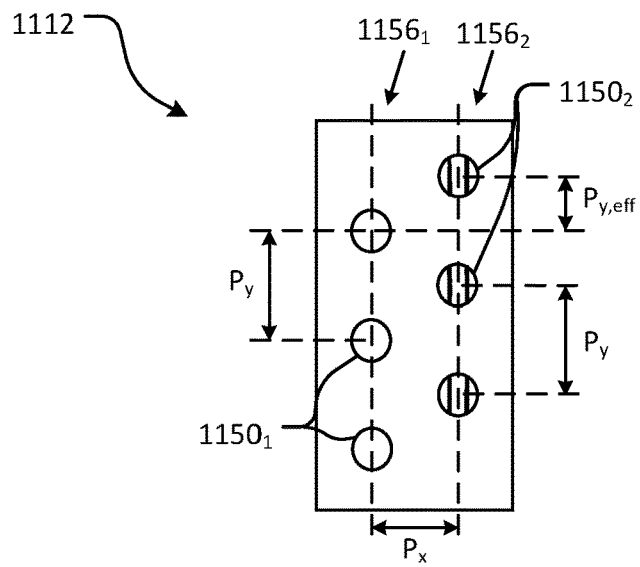
FIG. 11A illustrates an example of a portion of an augmented 1-dimensional pixel array.

Referring now to FIG. 11A, an example of a portion of an augmented 1-dimensional pixel array is illustrated. As an example, the illustrated portion may be the part of the pixel array 1112 that is within circle 11A of FIG. 10. As illustrated, the pixel array 1112 may include a first column 1156$_1$ of pixels 1150$_1$ and a second column 1156$_2$ of pixels 1150$_2$. Within the full pixel array 1112, columns 1156$_1$ and 1156$_2$ may include tens, hundreds, or thousands or more pixels. For example, in some embodiments, each column 1156$_1$, 1156$_2$ may include 500, 1000, 1500, 2000, 2500, 3000, or more pixels 1150$_1$, 1150$_2$, or any number therebetween. Columns 1156$_1$ and 1156$_2$ are spaced apart by a horizontal pixel pitch $P_x$. In some embodiments, as disclosed herein, the pixels may be individual LED's. Within each column 1156$_1$, 1156$_2$, adjacent pixels 1150$_1$, 1150$_2$ are spaced by a vertical pixel pitch $P_y$. $P_x$ and $P_y$ may be functions of the physical size of individual pixels within the pixel array, and the ability of manufacturing processes to form pixels close together. It will be appreciated that manufacturing constraints may limit how closely the pixels may be spaced, e.g., how small $P_x$ or $P_y$ may be. When implemented with a scanning reflective element to produce a 2D image, each pixel outputs light corresponding to a fixed position in a first dimension of the displayed image and a time-varying position in the second dimension of the displayed image; that is, each pixel may output image information for the same position along different lines of resolution in a displayed image, while the position of a line resolution depends on the synchronization of light output by the pixel and the temporally changing position of a scanning reflective element.

Figure 11B:
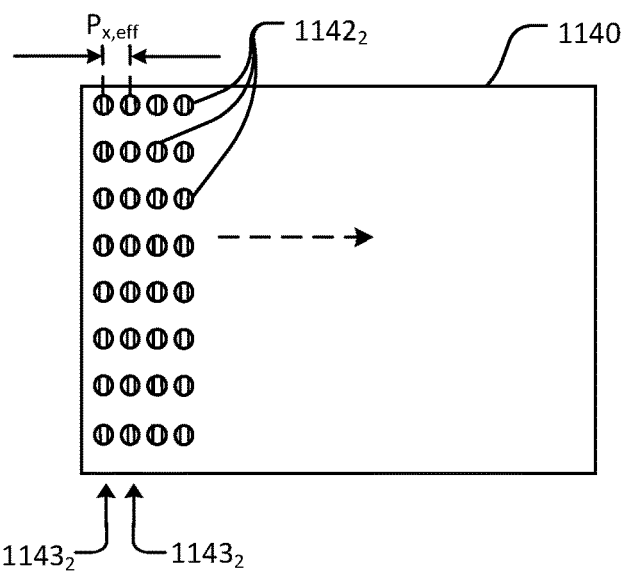
FIGS. 11B and 11C illustrate an example method for displaying high-resolution 2-dimensional images using the augmented 1-dimensional pixel array of FIG. 11A and a scanning reflective element.
Figure 11C:
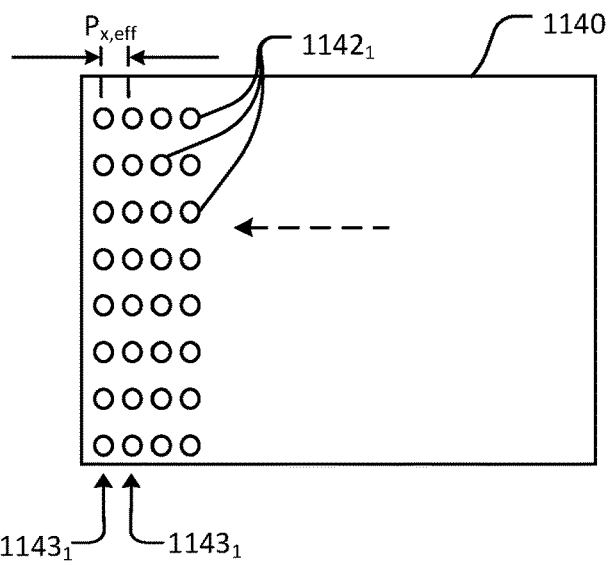

FIGS. 11B and 11C illustrate an example method for displaying high-resolution 2-dimensional images using the augmented 1-dimensional pixel array of FIG. 11A and a scanning reflective element. As shown in FIG. 11B, in one example display method, the pixels 1150$_2$ of column 1156$_2$ (FIG. 11A) may output pulsed image light while the displayed column location sweeps rightward to form displayed pixels 1142$_2$. The pixels 1150$_1$ of column 1156$_1$, may output pulsed image light while the displayed column location sweeps leftward to form displayed pixels 1142$_1$. Accordingly, the combined rightward and leftward sweeps form a high-resolution image on a relay optics light-receiving area 1140, with the combined pixels from the rightward and leftward sweeps having an effective vertical pixel pitch $P_{y,eff}$. In embodiments in which the vertical pixel pitch $P_y$ of each column is limited by the physical size of individual LED elements, the projection method of FIGS. 11B and 11C may therefore allow for an effective pixel pitch $P_{y,eff}$ that is smaller than provided by either a 2D array or a single-column 1D array with a scanning reflective element. As noted herein, although only a single column the of pixels is projected at any particular time in some embodiments, all of the pixels forming an image (e.g. all of the pixels across the light-receiving area 1140) are preferably projected onto the light-receiving area 1140 within a flicker fusion threshold of the viewer, such that the viewer perceives all of the pixels as being simultaneously present. It will be appreciated that the light-receiving area 1140 may correspond to the light-receiving area 1040 of FIG. 10, and the displayed pixels 1142$_1$, 1142$_2$ may correspond to the pixels 1042 of FIG. 10.

In the scanning method shown in FIGS. 11B-11C, the effective horizontal pixel pitch $P_{x,eff}$ may be determined by the pulse frequency of the pixels 1150$_1$, 1150$_2$. For example, the pixel column 1156$_1$ may be pulsed on and off at a certain rate to project pixels to the scanning reflective element 1030 (FIG. 10). When turned on, the pixel column 1156$_1$ provides a single line of vertical resolution 1143$_1$ to the light-receiving area 1140. Similarly, the pixel column 1156$_2$ provides a single line of vertical resolution 1143$_2$ to the light-receiving area 1140. The spacings of non-overlapping lines of resolution 1143$_1$, 1143$_2$ define the horizontal spacing (pixel pitch $P_{x,eff}$) of the pixels 1142$_1$ and 1142$_2$, respectively. For example, since the distance traversed by the scanning reflective element 1030 increases with time and since the placement of a line of resolution 1143$_1$ depends upon the orientation of the scanning reflective element 1030, the more quickly the pixel column 1156$_1$ is pulsed, the more closely spaced the line of vertical resolution 1143$_1$ would be. Conversely, pulsing the pixel column 1156$_1$ at a lower rate would increase the horizontal spacing between vertical lines of resolution 1143$_1$ by allowing the scanning reflective element 1030 to traverse a greater distance between displaying different non-overlapping lines of resolution. Advantageously, controlling the frequency of the pulsing of the pixel columns 1156$_1$ and 1150$_2$ provides a simple scheme for changing the resolution of the displayed image along the horizontal axis. In some embodiments, the pulsing frequency of the pixel columns $1156_1$ and $1150_2$ may be dynamically modulated, e.g., while displaying a single image, to facilitate foveated presentation of images. For example, the pulsing frequency may be higher for lines of resolution corresponding to the center of a viewer's field-of-view, while the pulsing frequency may be lower for lines of resolution corresponding to the periphery of the field-of-view.

Although the examples of FIGS. 11A-11C are described with reference to embodiments in which the columns of the pixel arrays are activated sequentially, in some other embodiments two or more columns of the pixel array may project light simultaneously. Because the columns $1156_1$, $1156_2$ will project light to slightly different locations along the sweep direction for any particular position of the scanning mirror, the columns $1156_1$, $1156_2$ may correspondingly project light for different x-dimension coordinates simultaneously. In some embodiments, the displacement along the sweep direction by the two columns of simultaneously projected display pixels $1142_1$, $1142_2$ may be equal to $P_x$.

Figure 12A:
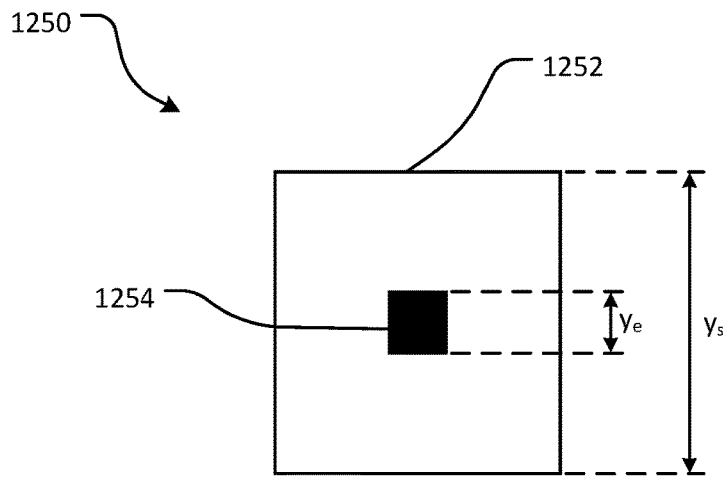
FIG. 12A illustrates an example pixel of a pixel array.

Referring now to FIG. 12A, an example pixel element 1250 is illustrated. The pixel element 1250 may form part of a pixel array. The pixel element 1250 may be, for example, an emissive pixel, such as an LED, OLED, and the like. The pixel element 1250 comprises a substrate 1252 and a light-emitting surface 1254. In some embodiments, the light-emitting surface 1254 may be understood to be a pixel. For example, the light-emitting surface 1254 may correspond to individual ones of the pixels $1150_1$, $1150_2$ (FIG. 11A). It will be appreciated that manufacturing constraints, such as lithography or other patterning and processing limitations, may limit how closely neighboring light-emitting surfaces 1254 are spaced. As a result, there may be an area surrounding the light-emitting surface 1254 within which it is not practical to form other light-emitting surfaces 1254. Consequently, the example pixel element 1250 is defined generally by a substrate dimension $y_s$ and a light-emitting surface dimension $y_e$ smaller than $y_s$. As described herein, display systems according to various embodiments may provide an effective pixel spacing that is smaller than readily achieved by manufacturing.

Figure 12B:
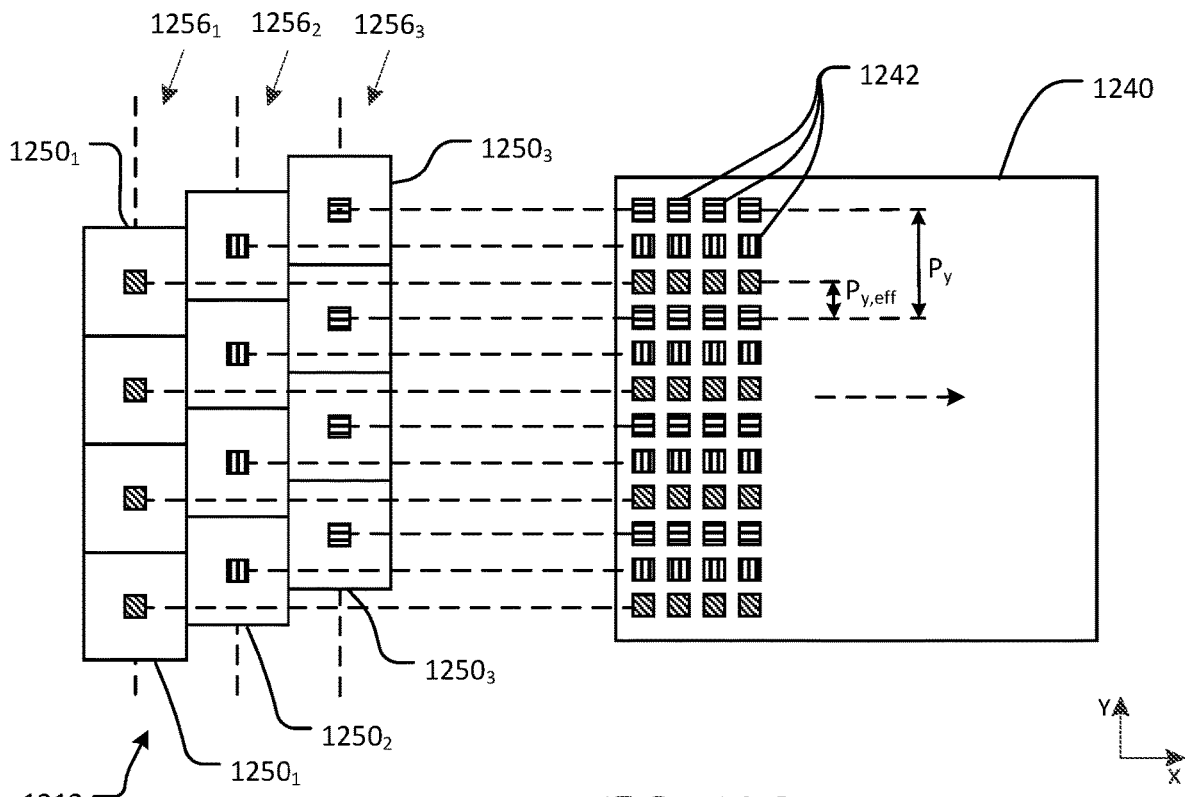
FIG. 12B illustrates an example augmented 1-dimensional emissive pixel array including offset columns of pixels.

Repeating ones of the pixel element 1250 may form a pixel array. FIG. 12B illustrates a portion of an example augmented 1D pixel array 1212 including offset columns of pixels. The example augmented 1D pixel array 1212 includes three columns $1256_1$, $1256_2$, $1256_3$ of pixel elements $1250_1$, $1250_2$, $1250_3$ (respectively), which may each correspond to the pixel element 1250 (FIG. 12B). It will be appreciated that the vertical dashed lines indicate the lengthwise axis of each of the columns $1256_1$, $1256_2$, $1256_3$. In addition, as shown by the horizontal dashed lines, the light-emitting surface of each pixel element $1250_1$, $1250_2$, $1250_3$ forms one row of displayed pixels 1242 on the light-receiving area 1240. Thus, the (x,y) position of the displayed pixel 1242, projected at any given time from a particular pixel $1250_1$, $1250_2$, $1250_3$, has a y-coordinate determined by the fixed y-coordinate of the pixel $1250_1$, $1250_2$, $1250_3$ within the pixel array 1212. The displayed pixel 1242 also has an x-coordinate determined by a combination of the position of the scanning reflective element and the timing of pulsing of a respective column $1256_1$, $1256_2$, $1256_3$.

As shown by the example of FIG. 12B, an increased number of offset columns in the augmented 1D array 1212 may result in a smaller effective y-dimension pixel pitch $P_{y,eff}$ and may accordingly provide a higher possible display resolution. For example, an array 1212 with three offset columns may allow for an effective pixel pitch $P_{y,eff}$ that is reduced by a factor of 3 relative to $P_y$, where $P_y$ is the pixel pitch for an individual column $1256_1$, $1256_2$, $1256_3$. In some embodiments, more than three columns may be included within the array 1212 to provide an even smaller pixel pitch. For example, a pixel array with five otherwise similar offset columns, each having a physical pixel pitch $P_y$, may provide an effective y-dimension pixel pitch $P_{y,eff}$ that is equal to 20% of the physical pixel pitch $P_y$.

Similar to the example display system of FIGS. 11A-11C, the columns $1256_1$, $1256_2$, $1256_3$ are preferably pulsed on and off sequentially. In some embodiments, one or more of the columns $1256_1$, $1256_2$, $1256_3$ maybe pulsed on simultaneously, as described herein. For example, in some embodiments, two of the columns $1256_1$, $1256_2$, $1256_3$ may be pulsed on to emit light at the same time. In another example, a four-column augmented 1D pixel array may project light from all four columns simultaneously, and/or may project light from one column at a time or from alternating pairs of columns. Due to the relatively high scanning rates achievable with some scanning reflective elements, a variety of such array control schemes may be utilized.

Figure 13A:
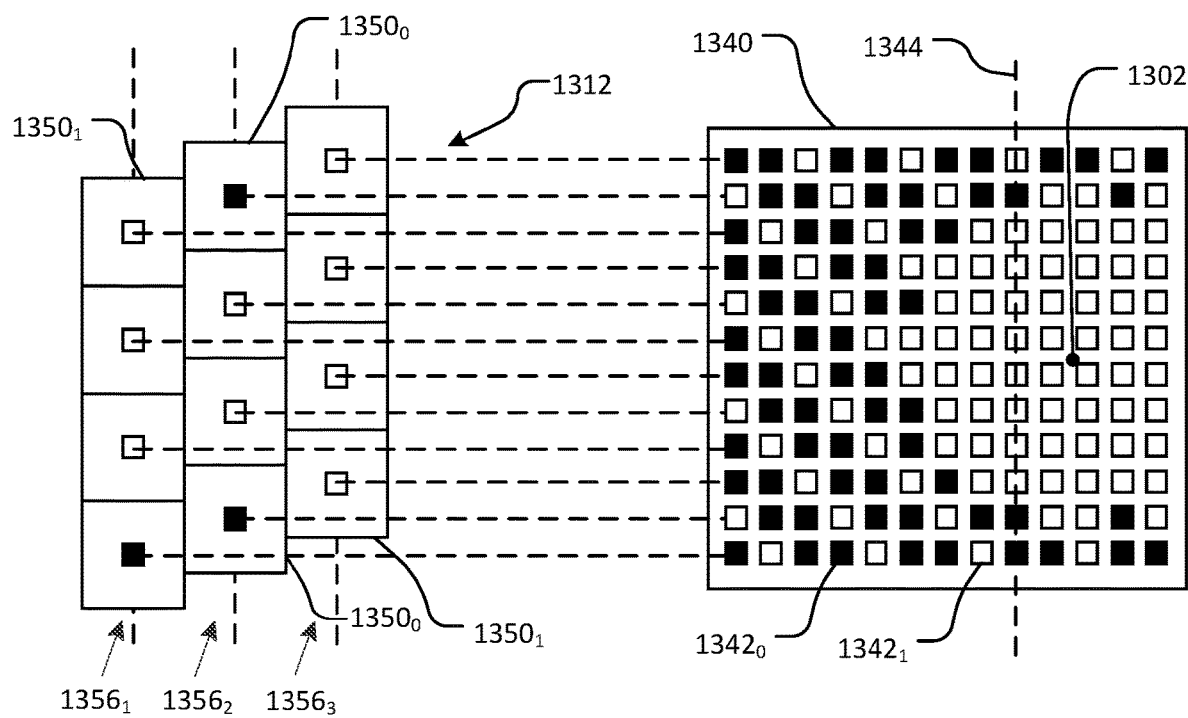
FIG. 13A illustrates an example of foveated rendering using an augmented 1-dimensional pixel array.

FIG. 13A illustrates an example of foveated rendering using an augmented 1D pixel array 1312. The pixel array 1312 may correspond to the pixel array 1212 of FIG. 12B. Generally, foveated rendering includes displaying an image with a variable resolution across the image based on tracking the eye gaze direction of a viewer, with a relatively high resolution near the center of the viewer's gaze and a relatively low resolution in regions of the image away from the center of the viewer's gaze. In some embodiments, foveation may reduce energy consumption by reducing the amount of light projected by the display and/or by reducing the processing power required to generate an image.

As shown in FIG. 13A, various embodiments may incorporate foveation. FIG. 13A illustrates an example foveated image projected on a light-receiving area 1340. The light-receiving area 1340 may correspond to the light-receiving areas 1040, 1140, 1240 (FIGS. 10, 11B-11C, and 12B respectively). Light-colored "available" pixels $1342_1$ correspond to pixels that are available to provide image light, and darkened "unavailable" pixels $1342_0$ correspond to pixels that are not available to provide image light during a sweep of the scanning mirror. In a region around the viewer's fixation point 1302 (where the viewer's gaze is focused), all pixels are available to output image light to provide high-resolution image content in that region. For the remaining portions of the image, a smaller portion of the pixels are available. As a result, relatively low-resolution image content is provided in those remaining portions. In the example foveated image of FIG. 13A, approximately one third of the pixels are available to provide image information in the regions away from the fixation point 1302. The example three-column augmented 1D array 1312 of FIG. 13A illustrates an example configuration of "available" pixels $1350_1$ and "unavailable" pixels $1350_2$ that would be utilized to form the line of resolution 1344. In some other embodiments, rather than making some pixels unavailable to reduce resolution, to decrease resolution, some pixels may be configured as duplicates. The duplicates display the same image information simultaneously. Thus, the number pixels in a given line of resolution 1344 may be reduced by making some pixels in the columns $1356_1$, $1356_2$, $1356_3$ unavailable and/or by increasing the effective size of the pixels by outputting the same image information from multiple pixels.

Figure 13B:
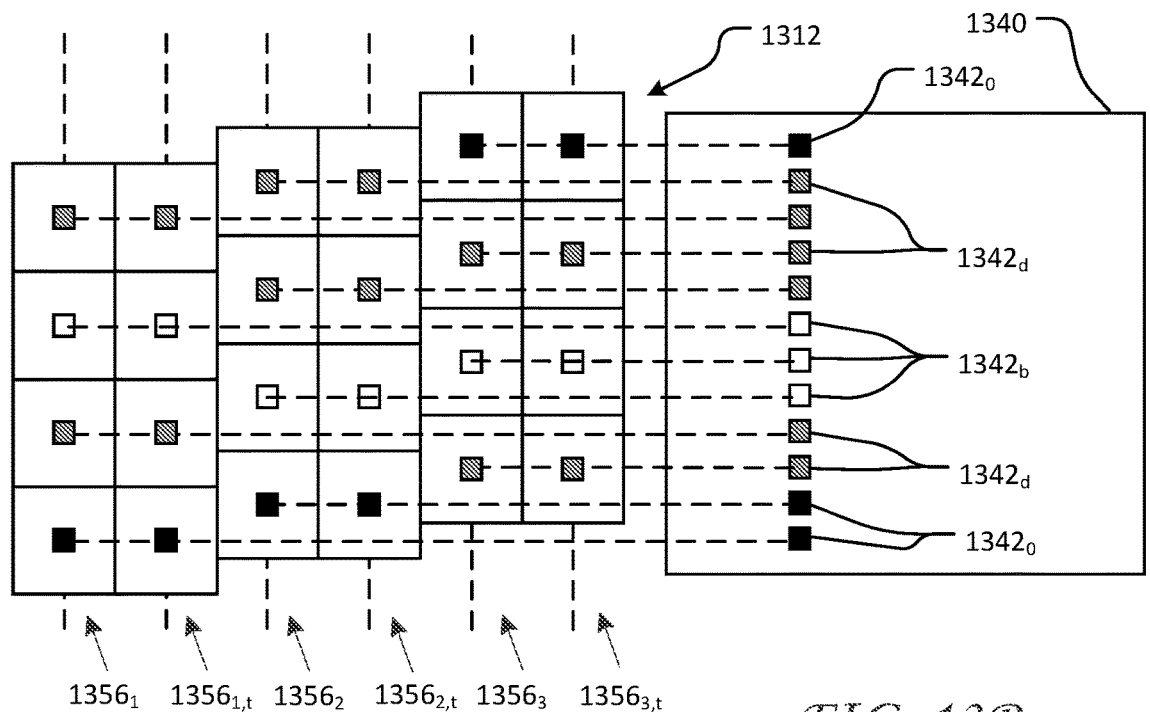
FIG. 13B illustrates an example pixel array having multiple pixel columns for forming individual projected pixels.

With reference now to FIG. 13B, in some embodiments, the pixel array may utilize multiple pixel columns to form a given projected pixel. This may have advantages for increasing the dynamic range of the display system by, for example, increasing the maximum brightness of pixels outputted to a viewer. The augmented 1D pixel array 1312 of FIG. 13B includes doubled-up pixel columns $1356_1$, $1356_2$, $1356_3$; that is, each pixel column $1356_1$, $1356_2$, $1356_3$ has an identical twin column $1356_{1,t}$, $1356_{2,t}$, $1356_{3,t}$, respectively. A given pixel column and its twin are configured to pulse on at different times and to be synchronized with the movement of the scanning reflective element 1030 (FIG. 10) such that they project pixels onto the same locations in the light-receiving area 1340. Thus, for a given pixel projected onto the light-receiving area 1340, twice the amount of light may be provided, thereby increasing the maximum brightness of the pixel.

Advantageously, the inclusion of two or more twin columns of pixels in the pixel array 1312 for displayed pixel allows a wider range of brightness levels. In the example column of displayed pixels $1342_0$, $1342_d$, $1342_b$, displayed pixels $1342_0$, are "off" pixels for which both corresponding pixels of the augmented 1D array 1312 are not projecting light, displayed pixels $1342d$ are "dim" pixels for which both corresponding pixels of the augmented 1D array 1312 are outputting less than maximum levels of light, and displayed pixels $1342_b$ are "bright" pixels for which both of the two corresponding pixels of the augmented 1D array 1312 are outputting light. In some embodiments, rather than having both corresponding pixels of the pixel columns output similar levels of light, the corresponding pixels may output different levels of light. For example, a pixel in column $1356_1$ may be configured to output light while a twin pixel in the twin column $1356_{1,t}$ may be configured to output a different level of light to thereby form a corresponding pixel on the light-receiving area 1340 having an intermediate level of brightness. In some embodiments, this may provide improved control over brightness levels and/or allow for compensating nonuniformities in the amount of light outputted by particular pixels.

Each pair of adjacent pixels within a doubled pair of columns $1356_1/1356_{1,t}$, $1356_2/1356_{2,t}$, $1356_3/1356_{3,t}$ thus corresponds to a single row of displayed pixels. In some embodiments, a pair of adjacent pixels may project light on alternating sweeps of the scanning mirror. It will be appreciated that, while the columns of each doubled pairs of columns are illustrated as being directly adjacent to one another, in some embodiments, intervening columns may be provided between column twins.

Various example embodiments of the invention are described herein. Reference is made to these examples in a non-limiting sense. They are provided to illustrate more broadly applicable aspects of the invention. Various changes may be made to the invention described and equivalents may be substituted without departing from the spirit and scope of the invention.

For example, while advantageously utilized with AR displays that provide images across multiple depth planes, the augmented reality content disclosed herein may also be displayed by systems that provide images on a single depth plane. In addition, while the pixel arrays and scanning reflective elements are oriented in the figures as providing vertical lines of resolution, it will be appreciated that the pixel arrays and scanning reflective elements may also be configured to provide horizontal lines of resolution. For example, the pixel arrays and scanning effective elements may be rotated by 90° and appropriately provided with image content to provide horizontal lines of resolution for images. In such cases, the pulsing frequency of the horizontal rows of pixels in the pixel array determines the vertical pitch of the pixels. Thus, the displayed image may be drawn using vertically extending lines of pixels, from right-to-left or left-to-right, or using horizontally extending lines of pixels, from top-to-bottom or bottom-to-top of the image. Configurations with horizontally extending lines of pixels may be advantageous in typical video pipeline, e.g., display port, MIPI, etc., where video data are may be sent horizontal line by horizontal line.

In addition, many modifications may be made to adapt a particular situation, material, composition of matter, process, process act, or step(s) to the objective(s), spirit, or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

What is claimed is:

1. A display system comprising:
    an emissive pixel array comprising first and second columns of pixels;
    relay optics configured to receive incident light and to output the incident light to a viewer; and
    a scanning mirror disposed to receive the light from the first and second columns of pixels and to reflect the received light toward the relay optics,
    wherein the scanning mirror is configured to move between a plurality of positions comprising a first position and a second position, the first position oriented for the scanning mirror to reflect the light from the first column of pixels onto the relay optics as a first one-dimensional array of pixels, the second position oriented for the scanning mirror to reflect the received light from the second column of pixels onto the relay optics as a second one-dimensional array of pixels,
    wherein locations for the first and the second one-dimensional array of pixels define spatially overlapping lines on the relay optics, and
    wherein the pixels of the first column of pixels are configured to emit light while the scanning mirror moves from a first position to a second position, and wherein the pixels of the second column of pixels are configured to emit light while the scanning mirror moves from the second position to the first position.

2. The display system of claim 1, wherein pixels of the first and second columns of pixels have a column pitch, wherein an effective pitch of a corresponding line of pixels on the relay optics is less than the column pitch.

3. The display system of claim 2, wherein the effective pitch is less than half the column pitch.

4. The display system of claim 1, wherein the pixel array is an emissive pixel array comprising an array of emissive pixels.

5. The display system of claim 4, wherein the emissive pixels comprise light emitting diodes (LEDs).

6. The display system of claim 5, wherein the emissive pixels have a pitch of 20 μm or less.

7. The display system of claim 1, wherein the first and second columns of pixels have parallel lengthwise dimensions, wherein pixels of the second column of pixels are offset along the lengthwise dimension relative to the pixels of the first column of pixels.

8. The display system of claim 7, wherein the pixel array further comprises at least a third column of pixels, the third column extending along the lengthwise dimension, wherein the third column is parallel to the first and second columns and the pixels of the third column are offset along the lengthwise dimension relative to the pixels of the first and second columns.

9. The display system of claim 8, wherein the first, second, and third columns are configured to emit light in temporally separated pulses during movement of the scanning mirror.

10. The display system of claim 1, wherein the pixel array is configured to provide image information corresponding to different total numbers of the pixels depending upon an orientation of the scanning mirror, such that effective pixel densities vary across the relay optics.

11. The display system of claim 1, wherein each of the first and second columns of pixels are doubled-up with a corresponding twin column having a same pixel pitch and same locations of pixels along a length of the column.

12. The display system of claim 1, wherein the relay optics comprises a waveguide comprising:
    an in-coupling optical element configured to receive light reflected from the scanning mirror and to redirect the received light for propagation within the waveguide by total internal reflection; and
    an out-coupling optical element configured to out-couple light propagating within the waveguide by total internal reflection.

13. The display system of claim 12, wherein the relay optics comprises a stack of waveguides, each waveguide comprising an in-coupling optical element and an out coupling optical element.

14. The display system of claim 1, wherein the pixel array is a transmissive pixel array.

15. An optical apparatus comprising:
    a pixel array comprising:
        a first column of pixels having a first pixel pitch along a lengthwise dimension of the first column; and
        a second column of pixels having the first pixel pitch along a lengthwise dimension of the second column,
        wherein the lengthwise dimension of the first column extends along the lengthwise dimension of the second column, and wherein the pixels of the second column are offset along the lengthwise dimension relative to the pixels of the first column, and
        wherein the pixels of the first column of pixels are configured to emit light while a scanning mirror moves from a first position to a second position, and wherein the pixels of the second column of pixels are configured to emit light while the scanning mirror moves from the second position to the first position.

16. The optical apparatus of claim 15, further comprising a scanning mirror disposed to receive the light from the first and second columns of pixels and to reflect the received light toward relay optics configured to direct received light to a viewer.

17. The optical apparatus of claim 15, configured to modify effective pixel densities by providing unique image information from less than all of the pixels of the first and second columns.

18. The optical apparatus of claim 15, wherein each of the first and second columns of pixels are doubled-up with a corresponding column twin having a same pixel pitch and same locations of pixels along a length of the column.

19. The optical apparatus of claim 15, wherein the pixels of the first and second columns have a same size and shape.

* * * * *